United States Patent [19]

Drisko

[11] Patent Number: 4,718,784
[45] Date of Patent: Jan. 12, 1988

[54] RATING PLATE PRINTING APPARATUS AND METHOD

[75] Inventor: James E. Drisko, Santa Rosa, Calif.

[73] Assignee: Electronic Programming Corporation, Santa Clara, Calif.

[21] Appl. No.: 929,560

[22] Filed: Nov. 10, 1986

[51] Int. Cl.$^4$ .............................. B41J 5/30; B41J 3/12
[52] U.S. Cl. ...................................... 400/68; 400/121; 101/93.04; 364/519
[58] Field of Search .......................... 400/63, 68, 121; 340/734, 711, 750; 364/519; 178/30; 101/93.04, 93.05

[56] References Cited

U.S. PATENT DOCUMENTS

| | | | |
|---|---|---|---|
| 4,125,829 | 11/1978 | Kayashima | 178/30 X |
| 4,180,857 | 12/1979 | Yoshihara | 364/519 X |
| 4,317,114 | 2/1982 | Walker | 340/734 X |
| 4,445,795 | 5/1984 | Levine | 400/63 |
| 4,542,378 | 9/1985 | Suganuma | 340/734 |
| 4,566,127 | 1/1986 | Sekiya | 340/734 X |
| 4,623,978 | 11/1986 | Aoki | 364/519 |
| 4,641,346 | 2/1987 | Clark | 400/104 X |
| 4,661,001 | 4/1987 | Takai | 400/120 X |

Primary Examiner—Paul T. Sewell
Attorney, Agent, or Firm—Ciotti & Murashige, Irell & Manella

[57] ABSTRACT

Printing apparatus and method for printing label designs on blank labels, where the blank labels are organized in rows of one or more labels per row. The apparatus includes a dot matrix impact printer with a resolution of at least 100 pixels per inch. The printer has both a text and a graphics printing mode of operation. A computer used to control the printing process stores label designs and graphic images in its memory. Each label design specifies one or more text strings, their position in the label, and one or more graphic images, and their position in the label. Text and graphic images can be positioned side by side.

The user specifies the identity and quantity of labels to be printed, the order in which to print the labels, and the number of blank labels there are in each row of labels to be printed. Each label contains a multiplicity of lines to be printed. The printing process proceeds by positioning the printer at the beginning of a row of blank labels. The computer then generates a list of the label designs to printed on the current row of blank labels. For each such line to be printed, the computer generates a list of the text strings and graphic images to be printed, along with information on where each item is to be printed. For each graphic image on this line, the computer selects the portion of the graphic image to be printed on the current line. Then the computer sends the printer commands to print the items in the list in accordance with the positioning information in the list, including sending commands to print the text strings in text mode and the graphic images in graphics mode.

10 Claims, 13 Drawing Figures

FIG_2

PRINT QUEUE AND ROW QUEUE

FIG_3

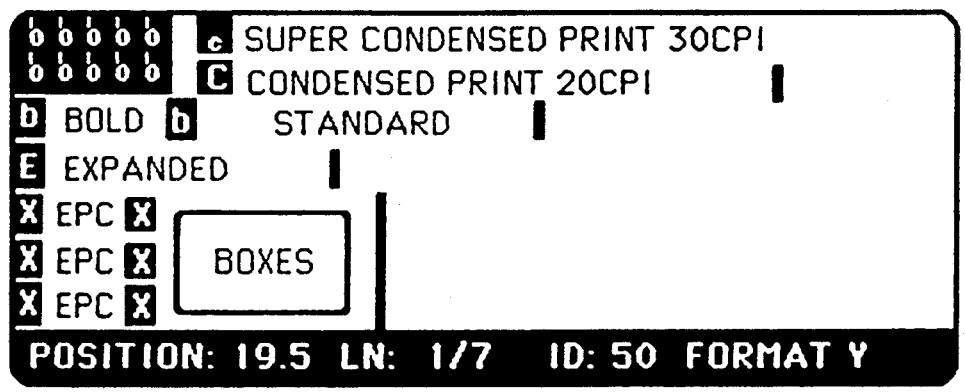
DISPLAY OF SAMPLE LABEL
FIG. 4
PRINTOUT OF SAMPLE LABEL
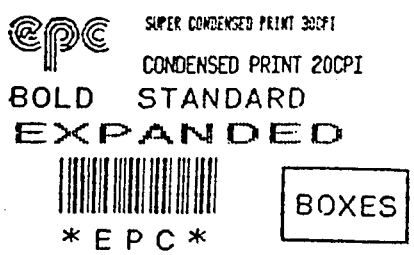
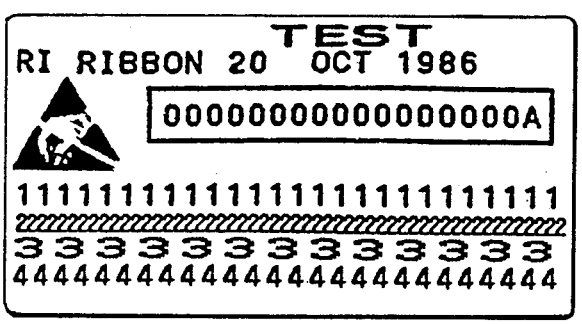
FIG. 5A.  FIG. 5B.

PRINT ROUTINE

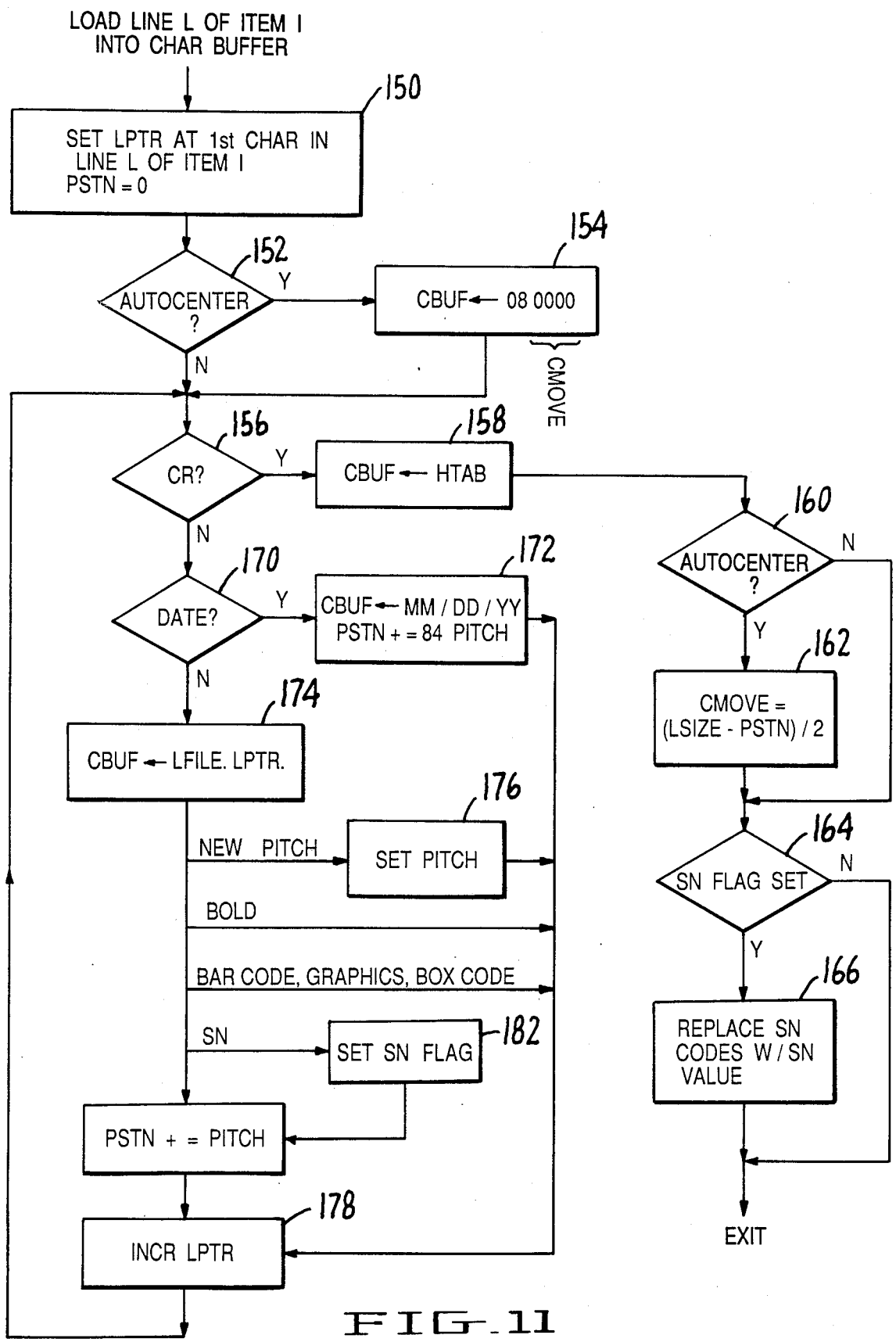
FIG_11

RATING PLATE PRINTING APPARATUS AND METHOD

The present invention relates generally to the printing of labels including both text and graphics, and particularly to a system for printing rows of high resolution labels wherein each of the labels in each row can be selected from a set of different labels in accordance with a specified printing pattern.

BACKGROUND OF THE INVENTION

Rating plates are permanent labels attached to various products to convey the product's serial number, the name and/or trademark of the manufacturer, date of manufacture, UL approval (UL is a trademark of Underwriters Laboratories, Inc.), and other similar information. Since the information on these plates must be readable for the life of the product, and sometimes beyond, the apparatus used for generating these plates must be designed to print plates that are easy to read and that cannot be erased by ordinary means.

Until recently, such plates were generally printed exclusively by professional printers in print shops. Due to the relatively high cost of setting up printing plates and the associated tooling, compared with the cost of printing each additional label, the cost per plate of printing rating plates this way is quite high unless a large quantity of labels (e.g., at least 10,000) is printed. The present invention virtually eliminates the cost of setting up a plate or label and thereby substantially reduces the cost of printing small quantities of rating plates and similar labels.

With the growing use of microcomputers and personal computers, there have been a number of programs written for printing labels using these machines. Generally, these programs have printed only text on labels, such as a set of addresses stored in a data base.

Other products, such as the MacIntosh computer made by Apple Computer include work processing programs that can combine text and graphics. While the documents created by such a product could be printed on labels, these products do not have a number of features which are important for a versatile label maker:

(1) efficiently using a high resolution printer for printing text and graphics side by side, (2) means for printing a series of different label designs on each row of labels, (3) means printing several different labels in an interleaved pattern, and for updating a different serial number for each one, (4) means for printing bar codes, and (5) a high resolution impact printer for making permanent and easy to read labels.

The term "text" is used herein to mean alphanumeric characters represented by a sandard text code, such as ASCII code. The term "graphics", on the other hand, is used herein to mean images which are represented by either an array of pixels, a set of vectors, or any equivalent means for representing images. Therefore, if an alphanumeric character is represented by an array of pixels instead of a text code, it is considered herein to be a graphic image rather than text.

While the term "label" is broader than the term "rating plate" (rating plates are permanent, high resolution labels), for most purposes the terms "plate", "rating plate" and "label" are herein used interchangeably.

All of the above identified features are important. First, the use of graphics is important because rating plates tend to be small, and therefore the manufacturer of the product is often identified by use of a trademark instead of the manufacturer's corporate name. Similarly, many product labels carry house marks indicating that the products have passed a well known set of quality standards.

Second, a number of the present invention's features are related to the need to use a high resolution impact printer. In the preferred embodiment, the printer is a Toshiba model 321, which is a 24 pin dot matrix impact printer with a resolution of 180 pixels per inch.

The need to accommodate conventional label designs and the small size of most rating plates make it important to be able to print both graphics and text side by side. At the same time, it is important to be able to print labels reasonably quickly. The problem here is that impact printers are generally much slower when printing graphics than when printing text. Therefore converting the entire label into a grapics image is not an acceptable solution, because it would make printing too slow. On the other hand, switching back and forth between graphics and text printing modes presents a number of other problems which are described, along with their solution, below.

Another feature, the ability to interleave the printing of different label designs, is important because many products need more than one rating plate or label. The present invention allows this feature to be fully exploited by providing a plurality of different print ordering patterns, and by allowing the different label designs being printed on the same line of blank labels to use the same and/or different graphics at the same or different vertical printing positions.

Still another feature of the present invention is the ability to put boxes around any selected portion of a label. Boxes are often used to highlight serial numbers, and sometimes other information which the user may need to provide when requesting help from the product's manufacturer.

Finally, the present invention provides the ability to automatically generate standardized bar codes in combination with text and graphics on a single rating plate or label. This combination of features allows the design and printing of plates with virtually the same flexibility as one would have using a print shop.

It is therefore a primary object of the present invention to provide an improved label printing apparatus and method that permits the design and printing of rating plates and other labels with a variety of features including the printing of text and high resolution graphics side by side, and interleaved printing of different labels.

SUMMARY OF THE INVENTION

In summary, the present invention is a printing apparatus and method for printing label designs on blank labels, where the blank labels are organized in rows of one or more labels per row. The apparatus includes a dot matrix impact printer with a resolution of at least 100 pixels per inch. The printer has both a text and a graphics printing mode of operation. A computer used to control the printing process stores label designs and graphic images in its memory. Each label design can specify one or more text strings, their position in the label, and one or more graphic images, and their position in the label. Text and graphic images can be positioned side by side.

The user specifies the identity and quantity of labels to be printed, and the order in which to print the labels. Each label can contain a multiplicity of lines to be printed. The printing process proceeds by positioning the printer at the beginning of a row of blank labels. The computer then generates a list of the label designs to printed on the current row of blank labels. For each such line to be printed, the computer generates a list of the text strings and graphic images to be printed, along with information on where each item is to be printed. For each graphic image on this line, the computer selects the portion of the graphic image to be printed on the current line. Then the computer sends the printer commands to print the items in the list in accordance with the positioning information in the list, including sending commands to print the text strings in text mode and the graphic images in graphics mode.

BRIEF DESCRIPTION OF THE DRAWINGS

Additional objects and features of the invention will be more readily apparent from the following detailed description and appended claims when taken in conjunction with the drawings, in which:

FIG. 4 depicts the display associated with an exemplary label design, FIG. 5A shows the exemplary label design when printed, and FIG. 5B shows another label design when printed.

FIGS. 7 through 12 are flow charts depicting the printing process in detail.

DESCRIPTION OF THE PREFERRED EMBODIMENT

Figure 1:
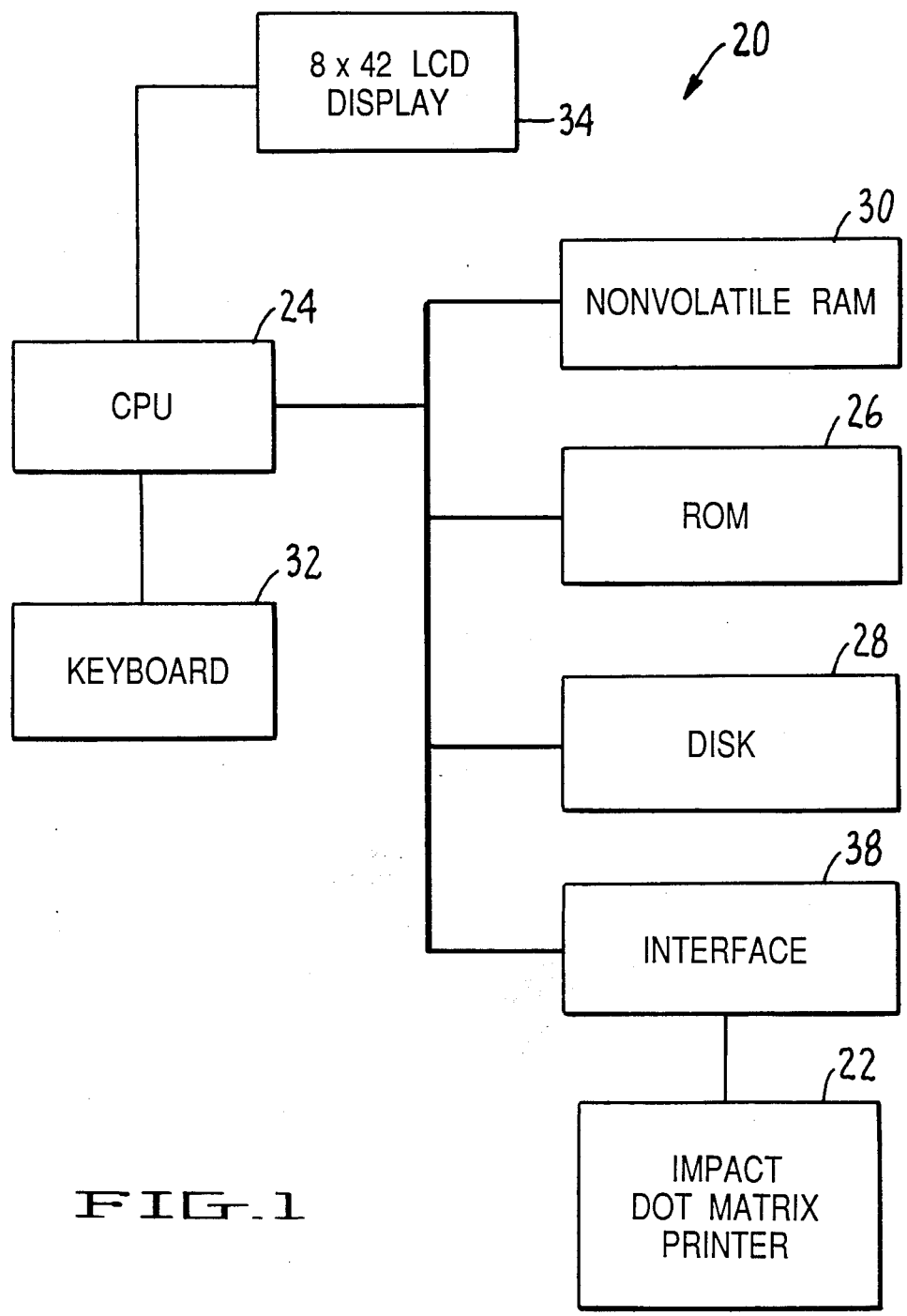
FIG. 1 is a block diagram of a label printing system in accordance with the present invention.

Referring to FIG. 1, the preferred embodiment of the present invention is a microprocessor based computer system 20 with a high resolution, impact, dot matrix printer 22. In the preferred embodiment, the printer is a Toshiba model 321, which is a 24 pin dot matrix impact printer with a resolution of 180 pixels per inch. To produce reasonable quality graphics on rating plates the printer should have a resolution of at least 100 pixels per inch. To produce permanent label images, indelible ink and special label materials are used.

The system's central processing unit CPU 24 is a microprocessor (an Intel 8088). The software for the CPU 24 is stored in a read only memory (ROM) 26. Label design files and graphics files are stored on disk 28, but reside in nonvolatile random access memory RAM 30 when they are being printed.

The CPU 24 has a keyboard 32 for receiving commands from the user, and is also used for inputting label designs. An 8 line by 42 character LCD 34 display is used to display label design files and also instructions to the user.

The CPU 24 sends commands to the printer 22 through an interface 38 which buffers the commands and data sent by the CPU. The interface is a standard eight bit parallel printer interface.

Data Structures Used By Printing Process

Figure 2:
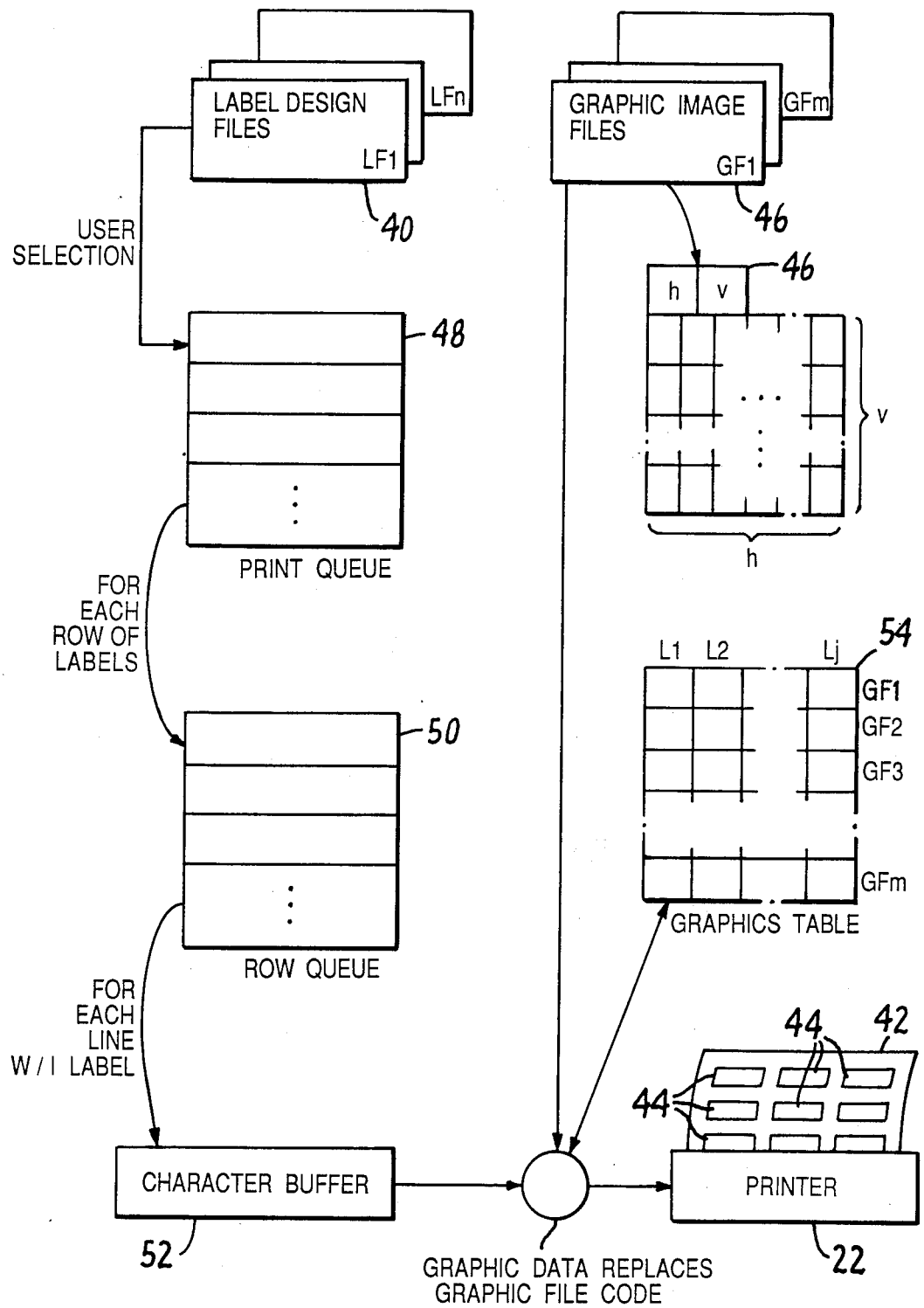
FIG. 2 depicts the primary data structures used in the printing process of the preferred embodiment.

FIG. 2 schematically depicts the main data structures used in the printing process and how those data structures are used.

A "label design" is the specification for a label. It defines all the element of the label: the dimensions of the label, the label's text strings, where the text strings are positioned, what size type to use, when to use bold print, and the placement of other special label features including boxes, bar code sequences, serial numbers, and graphic images.

The system 20 can store a multiplicity of label designs. Each label design is stored in a separate file, called a label design file 40. For convenience the label design files are identified as LF1 to LFn where n is the number of label designs currently stored in the system 20. These files are stored on disk 28. A copy of the file, however, is stored in RAM 30 when the corresponding label designs are being modified or printed.

As indicated above, each label design file specifies the dimensions of the label to be printed. Typically, labels and rating plates are printed on continuous forms 42 of blank labels 44. Usually, although not always, the blank labels 44 are organized in rows, with a plurality of labels in each row. Therefore, the design file must specify not only the size of the labels to be printed, by also the number of blank labels per row and the horizontal and vertical spacing between labels on the form 42. In the preferred embodiment, the spacing is specified in terms of the horizontal and vertical distances between the top left corners of adjacent blank labels.

The format for label design files, which is discussed in more detail below, is shown in Table 1.

Each graphic image which can be printed is stored in a separate graphic image file 46. When a graphic image is used in a label design, the label design references the graphic file GFx in which the image is stored. Like the label design files, these files are stored on disk 28, and a copy is stored in RAM 30 when needed for printing. In the preferred embodiment, graphic files are generated by a separate program which translates a specified bit mapped image into a graphic image file.

The format for graphic image files is shown in FIG. 2. As shown, the file 46 begins with two integers which define the horizontal (h) and vertical (v) dimensions of the images, measured in pixels. Since data is stored in one byte units in the system, the file 46 is organized as h columns by v/8 (rounded up) rows of data notes, and each byte represents eight vertically adjacent pixels. Thus each row of the file 46 represents a band eight pixels high across the image. If the height of the image is not an even multiple of eight pixels, a portion of the last row of bytes is filled with zero's. In addition, to facilitate data extraction during the printing process, the end of the file 46 is padded with three rows of blank (zero) data - increasing the number of rows of data bytes to $v/8 + 3$.

When the user selects a set of labels to be printed, the user specified (1) the label designs to be printed, (2) the quantity of each label design to be printed, and (3) the printing pattern, which specifies the order in which the labels are to be printed.

Figure 3:
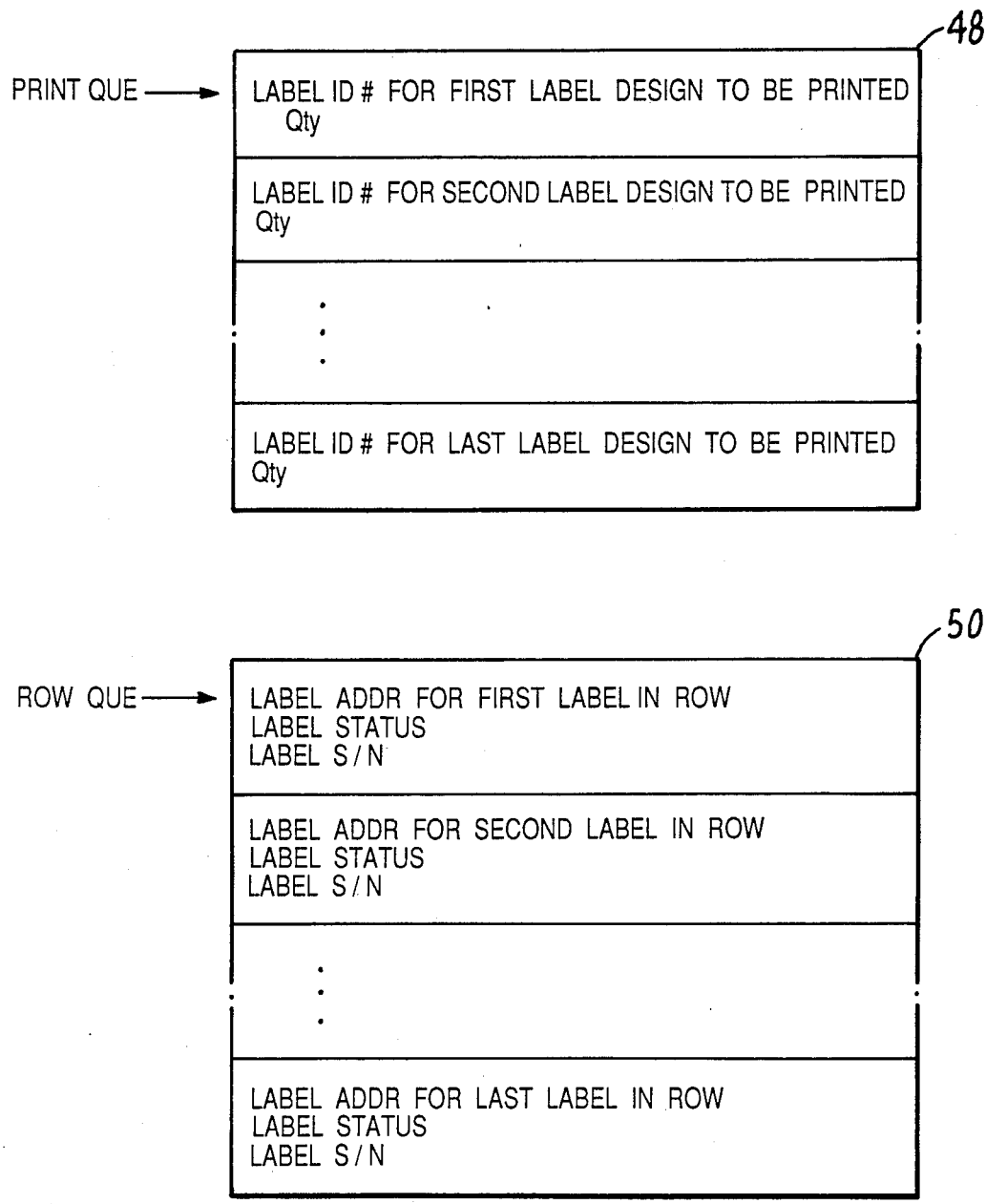
FIG. 3 depicts the Print Queue and Row Queue data structures of the preferred embodiment.

A list of the label designs selected for printing, and the quantity of each label to be printed, is stored in a data structure called the Print Queue 48. The structure of the Print Queue 48 is shown in FIG. 3. In the Print Queue 48 the specified label designs are identified by the name of the file, LFx, in which the label design is stored.

In the preferred embodiment, the user can specify one of three printing patterns: "set", "group", or "compacted group". In set mode, the labels in the print queue are printed one after another. The specified quantity of each label design to be printed is decremented as the label design is printed, and label designs are flushed from the print queue when the quantity of labels left to be printed reaches zero.

In group mode, all of the labels for the first specified label design are printed before the system prints the labels for the second specified label design. Each group of labels is printed beginning on a new row of labels.

Compacted group mode is the same as group mode except that when a new group labels is begun, the labels from the new group are printed starting with the first available blank label on the blank label form 42 rather than automatically indexing down to the next row of blank labels.

Given the specified printing pattern, the printing process proceeds by "transferring" a representation of each label to be printed on the current row of blank labels to a data structure called the Row Queue 50. The structure of the Row Queue is shown in FIG. 3. Therefore, if the user specified that three or more label designs are to be printed in "set" mode, and there are three blank labels per row, then the Row Queue will contain a sequential list of label designs from the Print Queue.

As each item is transferred from the Print Queue to the Row Queue, the following steps are taken: the quantity Qty of the label design is decremented, and three items are stored in the Row Queue: the address of the label design file, the status byte from the label design file, and the current value, if any, of the serial number associated with the label design. If there is a serial number associated with the label design, the serial number stored in the label design file is incremented after the serial number is stored in the Row Queue 50.

Once the Row Queue has been written for the current row of blank labels, the next step is to print each line within these labels. Each label will generally have a multiplicity of print lines. Furthermore, due to the vertical tabbing limitations of most printers, when a row of labels is printed, the system sequentially prints one line at a time across all of the labels in the current row before proceeding to the next line.

Printing proceeds by transferring one line of printing information into a character buffer 52, and then sending the information in the character buffer 52 to the printer. During this process, the information in the label design buffers is interpreted in two steps: certain types of data are converted for printing as they are put into the character buffer 52, and other types of data are converted when sent to the printer 22.

In particular, graphic image data is kept in the form of a file reference until it is time to send the graphic data to the printer 22. In the preferred embodiment, each label design can use a multiplicity of graphic images, but each graphic image can be used only once in each label design. This limitation is related to the Graph Table 54, which keeps track of what graphic data is to be printed on each line of each label design.

The Graph Table 54 stores a set of integers for the labels in the current row of blank labels, with each integer representing the number of rows of pixels which have already been printed for the corresponding graphic image. Thus the Graph Table 54 is a j by m array, where j is the number of labels to be printed in the current row, and m is the number of graphic images stored in the system. When it is time to print a line of a graphic image, the system references the Graph Table 54 to determine the row position of the next band of pixels to be printed.

Label Features

Before describing the printing process in detail, it is necessary to understand the format of the label dsign files 40 and the label features which can be represented therein.

Referring to Table 1, the Status Code specifies: (Bit 0) if the label design file is useable, (Bit 1) if text lines are to be centered, and (Bit 2) if a serial number is used in the label.

In the preferred embodiment, the user can specify that text lines in a label design are to be automatically centered when printed. Lines that mix text with graphic images, or any other feature that uses graphic mode printing, cannot be centered in the preferred embodiment. Therefore these lines are printed as represented in the label design, i.e., left justified.

Many rating plates assign a serial number to each product. To accommodate this requirement, four bytes are reserved for storing a double precision (i.e., 32 bit) serial number integer. The B2 bit in the Status Code is used as a quick reference during the printing process to determine if a serial number must be transferred and incremented.

After the serial number, the file contains a line by line specification of the label design. While the length of each line is variable, for most purposes it can be thought of as rectangular file. This orientation corresponds to the way the file is shown on the system's display 34, and is helpful when considered how multiline graphic images, boxes, and bar codes are represented. The display of an exemplary label design is shown in FIG. 4.

The placement of the serial number in the label design is marked by a series of "5C" bytes. When the label is printed, these "5C" bytes are replaced with the current serial number value.

The end of each line of the label design is marked by a standard ASCII carriage return code "OD".

If the current date is to be printed on a label, the label design includes a "10" date code at the position where the date is to be printed. The current date is provided by the user upon system power up or reset.

Five codes are used for specifying text size and darkness. Each time a Bold code is included in the file, the status of the printer's bold flag is toggled, thereby turning on or off the use of bold print. In the preferred embodiment, the use of bolt print is automatically turned off at the beginning of each line. Text size is specified by four codes which indicate that the following text is then (10) CPI (characters per inch), expanded to five (5) CPI, condensed to twenty (20) CPI, or super condensed to thirty (30) CPI.

Two types of bar codes can be printed using the preferred embodiment: "high density 3 of 9" and "interleaved 2 of 5". The bar codes are normally written on three consecutive lines: bars which are two lines high, and human readable values on a third line below the bars. (The preferred embodiment allows the user to increase or decrease the height of the bars.) Bar code sequences are coded in the corresponding lines of the label design file as a "begin bar code" code, the sequence of values to be encoded with bar codes, and an "end bar code" code.

To understand how the bar code sequences are printed, the following information on the printing process is needed. Text can be printed in the preferred embodiment either at six (6) lines per inch (6 lpi) (the normal density used by most American typewriters) or at eight (8) lines per inch (8 lpi).

The printer's print head can print up to 24 vertically adjacent pixels on each horizontal pass. Since there are 180 pixels per inch, each line is 30 pixels high at 6 lpi, and is 22.5 pixels high at 8 lpi. Thus, at 8 lpi it takes only one pass, printing 23 pixels (which will cause a one half pixel overlap for graphics) to print each line of the label design.

The number of pins used by the printer can be changed not only from line to line, but also from character to character and even from pixel to pixel within each printed line. At 6 lpi, however, it takes two horizontal passes, each vertically separated by 15 pixels, to print one line of a label design. A additional complication is added by the fact that there is generally an interline gap between lines of text. Thus, on the first pass, text is printed using as many of the printer's pins as necessary, but on the second pass no text is printed. Note that while most text is only 20 pixels (one ninth of an inch) high, some lower case characters (sometimes called descenders) extend lower than others, and therefore as many as 24 of the printer's 24 pins are used when printing text.

Since graphic images, boxes and bar codes do not have interline gaps, when the printer is in 6 lpi mode, these portions of the label must continue to be printed on the second pass for each line.

Returning to the discussion of bar code sequences, there is no interline gap between the first and second lines of printed bar codes. Therefore, in both 6 and 8 lpi modes the printer is programmed to print the bar code in what would otherwise be the interline gap. On the other hand, it is desirable to have an interline gap between the bottom of the bar codes and the human readable text printed below the bar code. As a result the first line of a bar code is coded for filling in the interline gap, the second line is coded for leaving the interline gap blank, and third line is coded for printing the human readable symbols corresponding to the specified bar code.

When in 6 lpi mode, bar code sequences are printed using 17 pins on the first pass of each line, and 17 pins again on the second pass for the first line (with the interline gap being filled in). By using 17 instead of 15 pins, it is ensured that the bars printed will be vertically continuous. On the second pass for the second bar code line, nothing is printed, thereby leaving an interline gap of 13 pixels between the bars and the human readable text below the bars.

Graphic images are represented by a block of codes which specify the graphic image file in which the image is stored. The number of codes used corresponds to the width and height of the graphic image, as measured in terms of the number of text characters it would take to occupy the same space. Thus if an image is six characters wide and three text lines high (rounded up), there will be a string of six graphic image codes in each of three consecutive lines in the label design file. Even if the size of the graphic image does not correspond exactly to an integer number of characters, the graphic image is given an amount of space on the printed label equal to the number of text characters coded in the label design.

In 6 lpi mode, 15 pins are used for printing graphic images on every pass. In 8 lpi mode, 23 pins are used for printing on each pass. Since the printer vertically tabs only 22.5 pins when it is in 8 lpi mode, this causes a slight overlap of half a pixel; but the resulting distortion of the graphic image is usually not easily noticeable.

Boxes are special graphic images, each of which is the size of the space occupied by one "10 CPI" text character. The user can put a box, or any portion of a box, around or between any specified portion of an image by putting the proper box codes into the label design. There are eleven box graphic images:

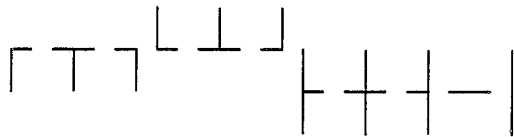

In the preferred embodiment, the font PROM for the printer 22 has been modified to include these box graphic images. In 6 lpi mode, the second pass is used only to print extended vertical line segments, which are defined as being the same as the vertical straight vertical line segment (so that only eleven font characters are needed even for 6 lpi mode).

Note that the font PROM of the printer 22 has also been modified to add the 20 CPI and 30 CPI character sets.

Example of Label Design

Table 2 is a listing of a label design file. FIG. 4 shows the corresponding display which would been seen by the user setting up or reviewing the label design. FIG. 5A shows the label design when printed. FIG. 5B shows another label design when printed.

Detailed Description of Label Printing Process

Figure 6:
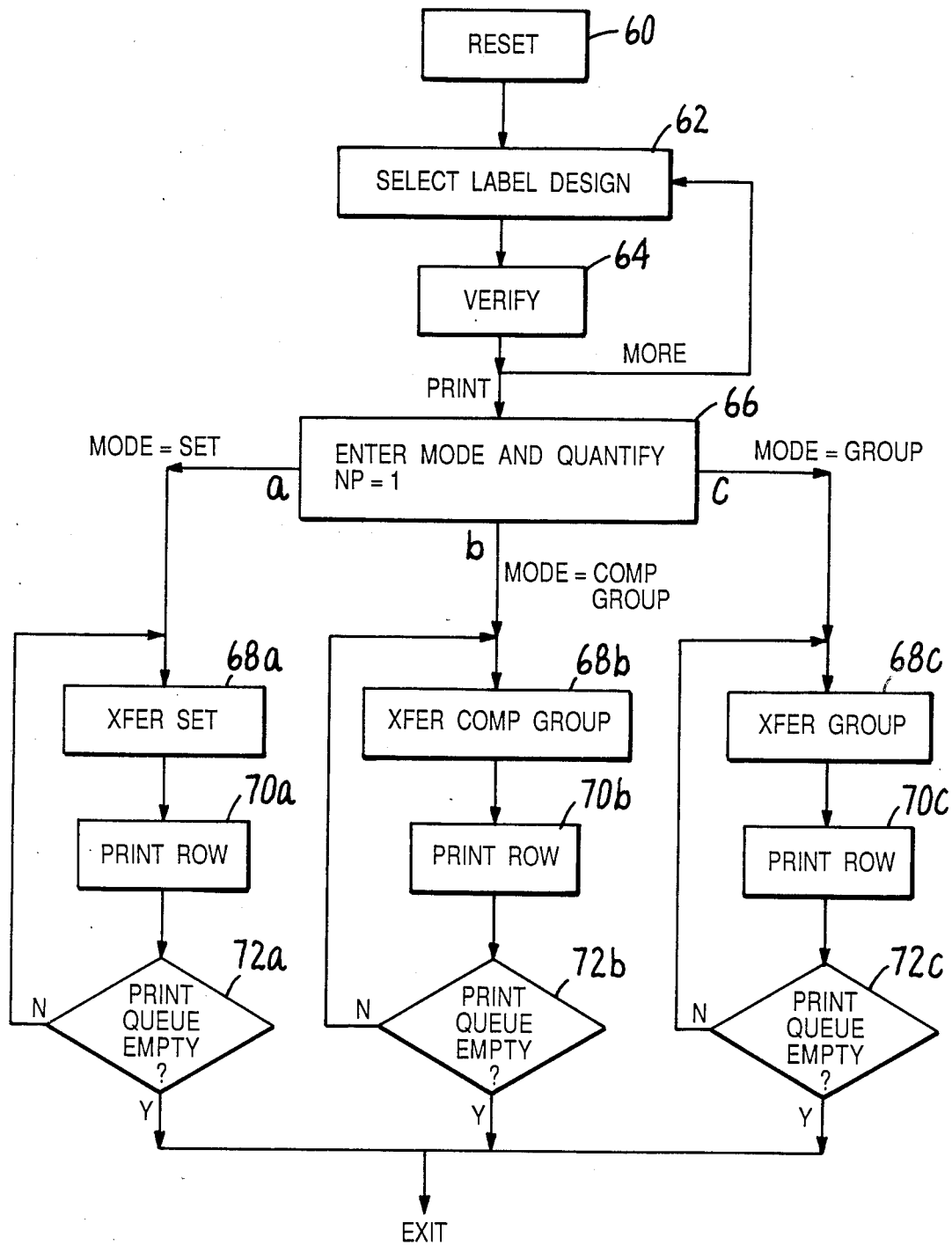
FIG. 6 is a flow chart of the printing process.

Referring to FIG. 6, the print routine begins by clearing the print queue (box 60). The user then specifies or selects, by means of the keyboard, the label designs which he wants to print (boxes 62–64). Since all the labels printed at any one time must be printed on the same blank label form, the print routine verifies that all of the specified label designs have the same format as specified for the first selected label design.

After the label designs to be printed have been selected, the user specifies the quantity of each label design to be printed, and the printing mode (box 66). At this point the process branches in one of three directions (a, b or c), depending on whether the printing mode is "set", "group" or "compacted group". Each of these branches is similar, except for the way in which the Row Queue 50 is loaded 68a–c. Once the Row Queue is loaded, one row of labels is printed (boxes 70a–c). The process of loading the Row Queue and printing the corresponding labels repeats until the Print Queue 48 is empty (boxes 72a–c).

Set Mode.

Figure 7:
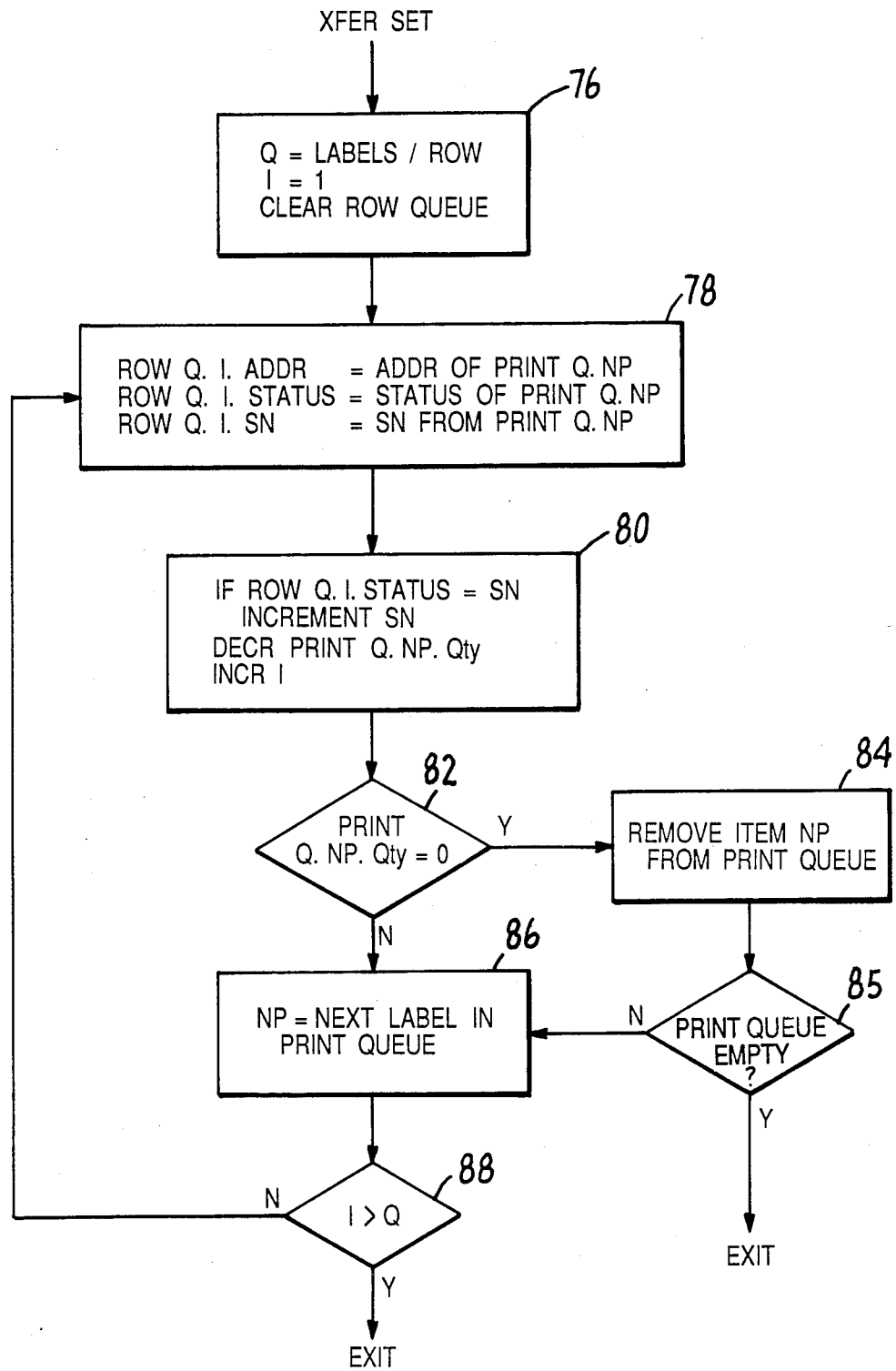

Referring to FIG. 7, the XFER SET routine for filling the Row Queue 50 in "set" mode is as follows. The Row Queue 50 is cleared, and the routine set the number of slots in the Row Queue, Q, to be filled equal to the number of blank labels per row on the blank label form (box 76).

The following nomenclature is used to refer to elements of the Print Queue and Row Queue data structures. The term XXX.J.AAA is used to refer to item AAA in the Jth slot of the XXX data structure. Thus RowQ.1.Addr is the address item of the first slot in the Row Queue data structure.

In this routine, the variable I identifies the Row Queue slot being filed, and the variable NP identifies the Print Queue item being transferred to the Row Queue. NP is initialized to equal one when the print process is initiated.

Starting with the first Row Queue slot, each slot of the Row Queue is processed as follows. First the slot is filled with the address, status and serial number of the label design file identified in slot NP of the Print Queue (box 78).

Then (box 80), if the status of this label design indicates that the label design uses the serial number feature, the serial number in the label design file is incremented (so that the next time the serial number is copied into the Row Queue, the corresponding label has the next serial number). Also, the variable I is incremented and PrintQ.NP.Qty is decremented as part of the process of keeping track of how many labels of each label design have been printed.

If PrintQ.NP.Qty is now equal to zero (box 82), the NPth item in the Print Queue is removed (moving up all the other items in the Print Queue) (box 84). In either case, the NP variable is then set to point to the next item in the Print Queue to be printed (box 86) unless the print queue is empty (box 85) - in which case the routine is finished and exits.

Finally, the current row item having been processed, the process continues if there are more items to be added to the Row Queue (box 88), and exits if the Row Queue is full.

Group Mode.

Figure 8:
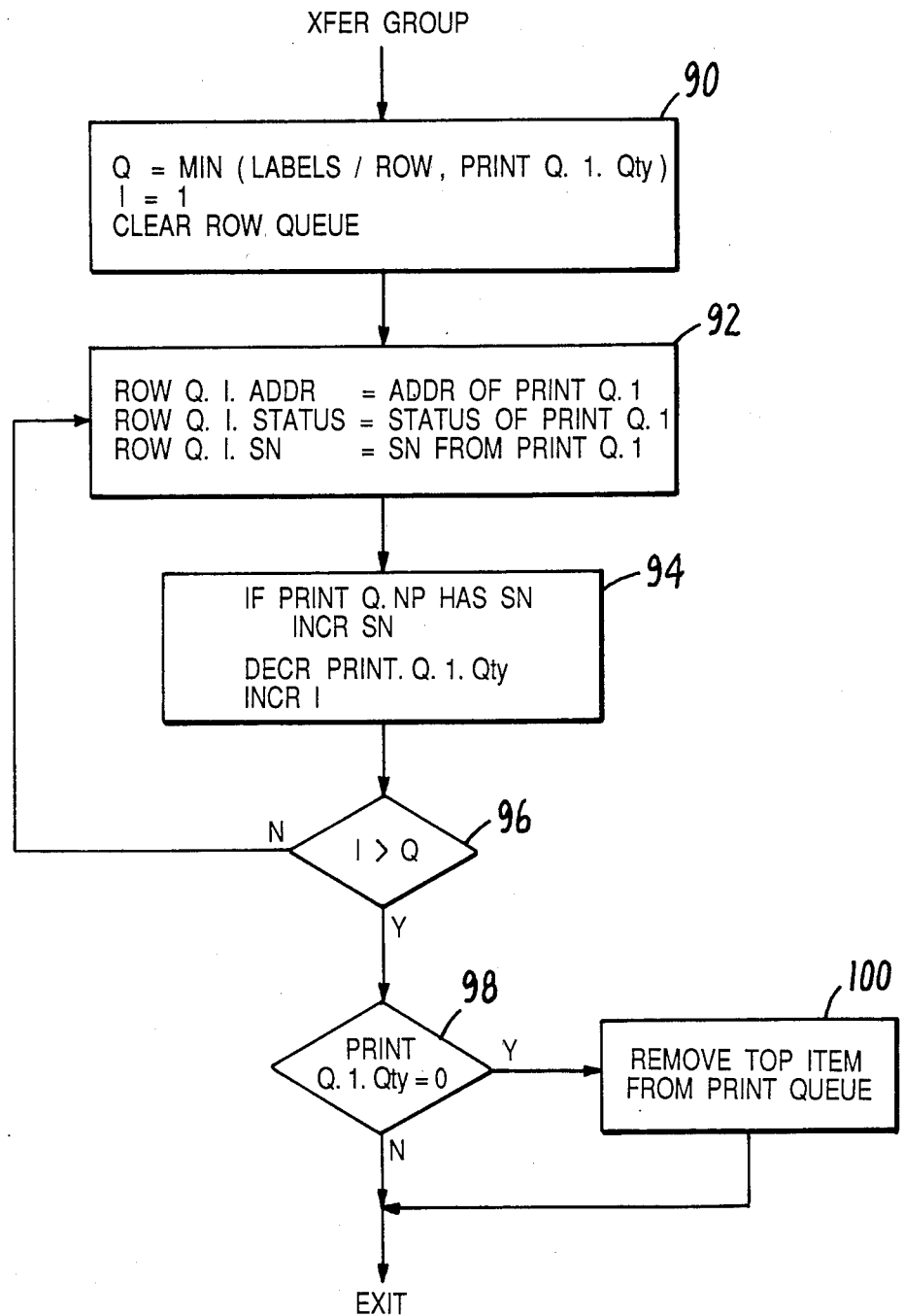

Referring to FIG. 8, the XFER GROUP routine for filling the Row Queue 50 in "group" mode is as follows. The Row Queue 50 is cleared, and the routine deermines the number of slots in the Row Queue, Q, to be filled (box 76). Q is the lesser of (a) the number of blank labels per row on the blank label form, and (b) the number of labels left to be printed for the first label design identified in the Print Queue 48.

Next (boxes 92 and 94), the Ith slot of the Row Queue is filled in the same way as described above for the XFER SET routine (see FIG. 7), except that the top item in the Print Queue 48 is always used as the source of the transferred information.

The slot filling process continues until all Q slots of the Row Queue 50 are filled (box 96). Then if all of the labels have been printed for the top item in the Print Queue (box 98), that item is removed from the Print Queue (box 100) before the routine exits.

Compacted Group Mode.

Figure 9:
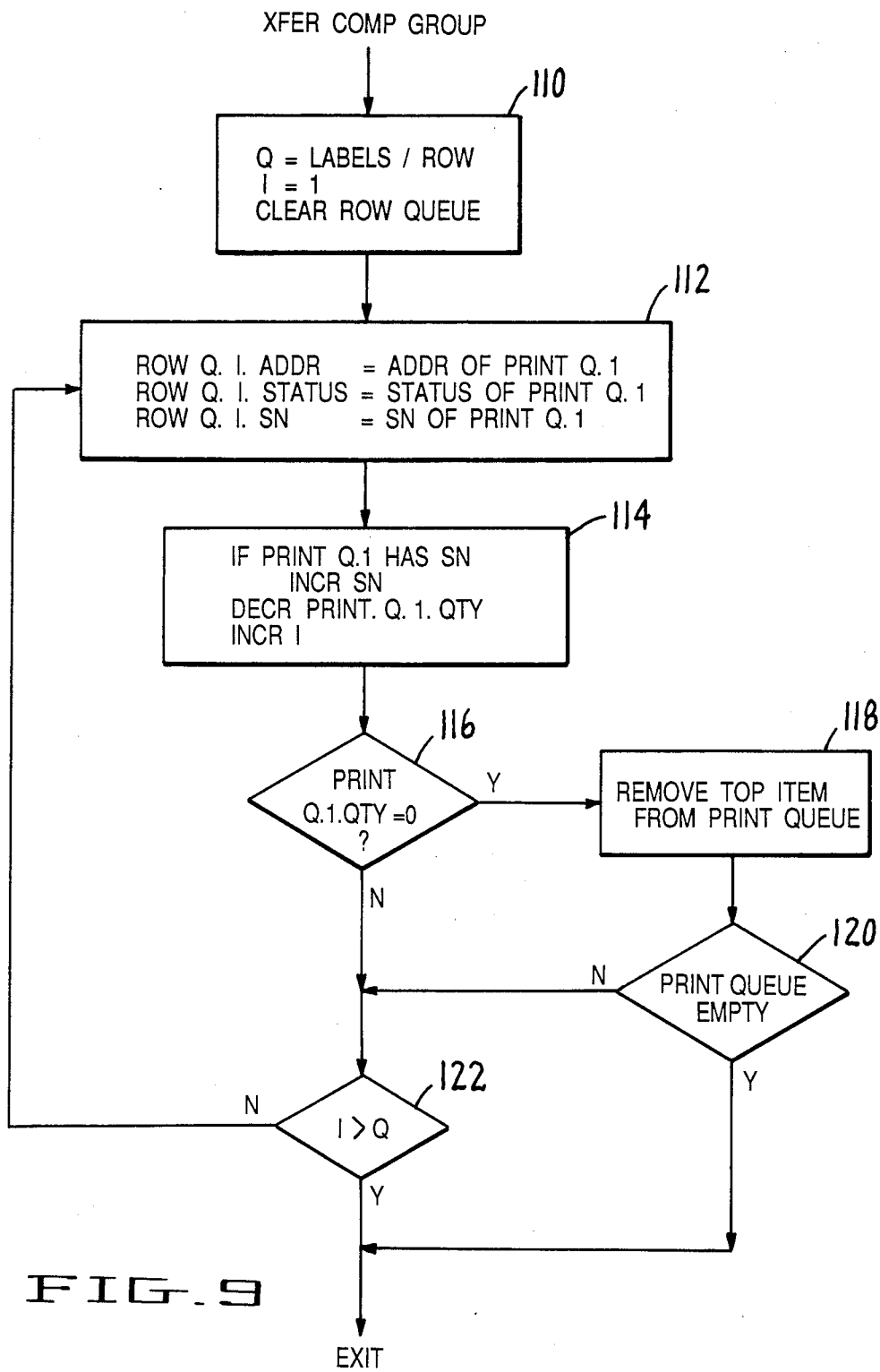

Referring to FIG. 9, the XFER COMP GROUP routine for filling the Row Queue 50 in "compacted group" mode is as follows. The Row Queue 50 is cleared, and the routine sets the number of slots in the Row Queue, Q, to be filled (box 76) equal to the number of blank labels per row on the blank label form. Next (boxes 112 and 114), the Ith slot of the Row Queue is filled in the same way as described above for the XFER GROUP routine (see FIG. 8), always using the top item in the Print Queue 48 as the source of the information transferred into the Row Queue.

Before moving onto the next slot of the Row Queue, the process checks to see if all of the labels have been printed for the top item in the Print Queue (box 116). If so, that item is removed from the Print Queue (box 118) and the routine checks to see if the Print Queue is empty (box 120). If so, the routine exits, otherwise the routines checks to see if all the slots of the Row Queue have been filed (box 122). If not, the process continues with the next slot of the Row Queue (at box 112); if so, the process exits.

Print Row.

Figure 10:
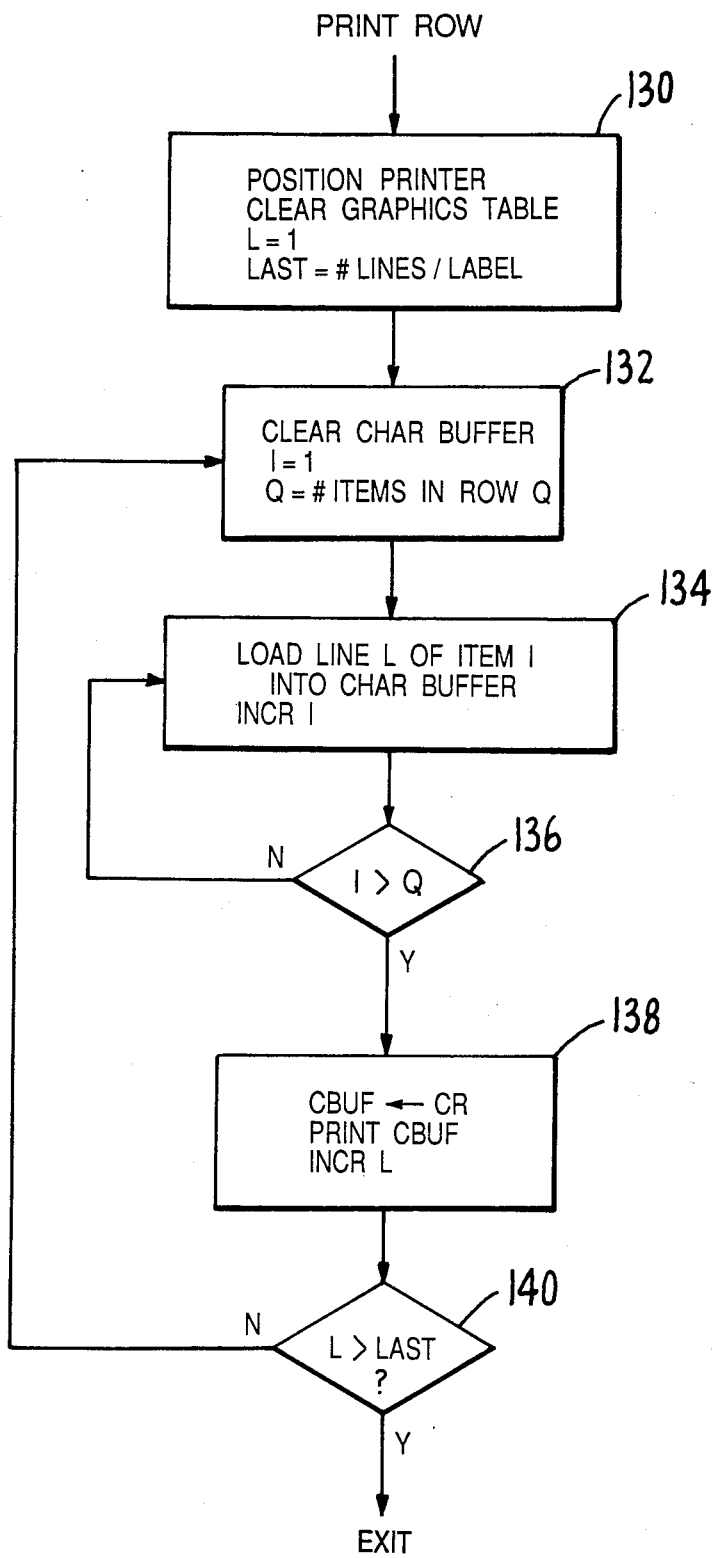

After the Row Queue 50 is filled in accordance with the specified print mode, the row of labels represented by the Row Queue is printed. Referring to FIG. 10, this process begins by (box 130) positioning the printer at the beginning of a row of blank labels, zeroing the graphics table 54, and setting up two variables: L for keeping track of which line is being printed, and Last for denoting the number of lines to be printed.

Then, for each line of the labels to be printed, the following steps (boxes 132-140) are repeated. First (box 132), the character buffer 52 (sometimes abbreviated as either "Char Buffer" or "CBuf") is cleared. The variable, I, used for indexing through the Row Queue is set equal to 1, and Q is set equal to the number of items in the Row Queue.

Second, the current line for each item in the Row Queue is loaded into the Character Buffer (boxes 134 and 136) (see FIG. 11). Finally, a carriage return is added to the end of the character buffer (box 138) to define the end of the current line, and the contents of the character buffer are sent to the printer (see FIG. 12).

This process is repeated for each line, until all the lines of the labels referenced in the Row Queue have been printed (box 140).

Loading CBuf.

Referring to FIG. 11, the process for loading the character buffer 52 with the information corresponding to one item in the Row Queue 50 works as follows. First (box 152), a pointer called Lptr is set to point at the first character in the current line (L) of item I in the Row Queue. Also, a pixel position counter, Pstn, is set equal to zero.

If the current label has autocentering enabled (box 152), three bytes of space are reserved in CBuf 52 (box 154). Later on, these bytes will used to instruct the printer 22 how far to tab in at the beginning of the line to center the text therein.

Table 3 lists the control codes used in the Character Buffer which are different from those listed in Table 1 for use in Label Design Files.

Next, each character in the current line is processed in accordance with its code value - as outlined in Table 1. As each printable character or graphic image is added to CBuf, the Pstn variable is incremented by the number of pixels occupied by the character or image. The variable called Pitch is equal to the number of pixels in a standard text character, at the currently specified text pitch. Note that, in FIG. 11, the equation $$Pstn + = X$$

means that the variable Pstn is increased by an amount equal to X.

If (box 156) the character is a carriage return, this represents the end of the current line for the item I. Therefore a horizontal tab code ("09") is put in CBuf (box 158), which will cause the printer to move over to the next label in the current row of blank labels. If, autocentering is enabled for the current label (box 160), the reserved autocentering bytes in CBuf, called CMove, are set equal to the number of pixels that the printer needs to tab in to center the current line:

CMove=(Lsize−Pstn)/2 where Lsize is the width of the label, measured in pixels, and Pstn is the total length of the text in the current line (box 162). Note that autocentering is enabled (i.e., allowed) only for label designs that include only text.

Finally, when processing a carriage return, if the serial number SN flag is set (box 164), the serial number codes in the current line are replaced with the digits of the serial number value in the Row Queue 50 (box 166). Then the routine exits.

When a data code is encountered (box 170) the current date, as previously entered by the user, is added to CBuf, preferably using a MM/DD/YY format (box 172), where MM is the month, DD is the day, and YY are the last two digits of the year. Since the date occupies eight characters, the Pstn variable is incremented by eight times the current Pitch value.

If the current character code is neither a carriage return nor a date code, the code is added to CBuf (box 174), except that the code "09" for super condensed print (30 CPI) is replaced with the code "0A" because "09" is used for horizontal tabbing.

If the code is a new pitch code, the current pitch value is changed 176 before the process moves onto the next code in the current line of the label design file (box 178). Pstn is not incremented.

If the code is a Bold code, Pstn is not incremented.

If the code is a Bar, graphic image or box code, then the Pitch and Pstn need not be adjusted because, in the preferred embodiment, autocentering is disabled for label designs that use bar codes and other graphics.

If the code is a serial number code, the SN flag (box 182) is set so that these codes will be replaced with the value of the current label design's serial number.

As indicated above, all the data for the current line is processed until a carriage return is encountered. As shown in FIG. 10, this process continues for all of the items in the Row Queue, and then a carriage return is added to the end of CBuf to define the end of the print line.

Printing CBuf.

Figure 12A:
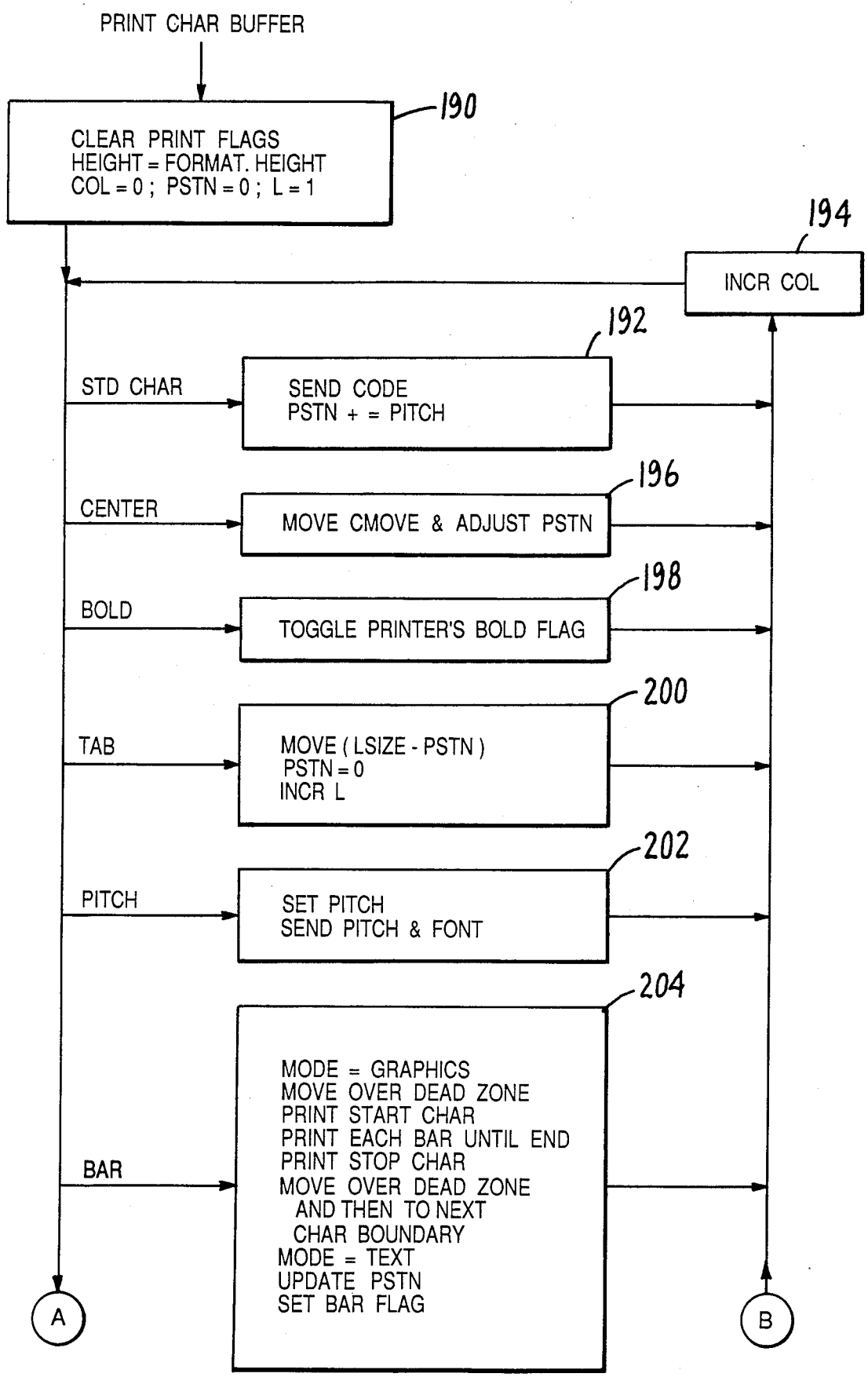
Figure 12B:
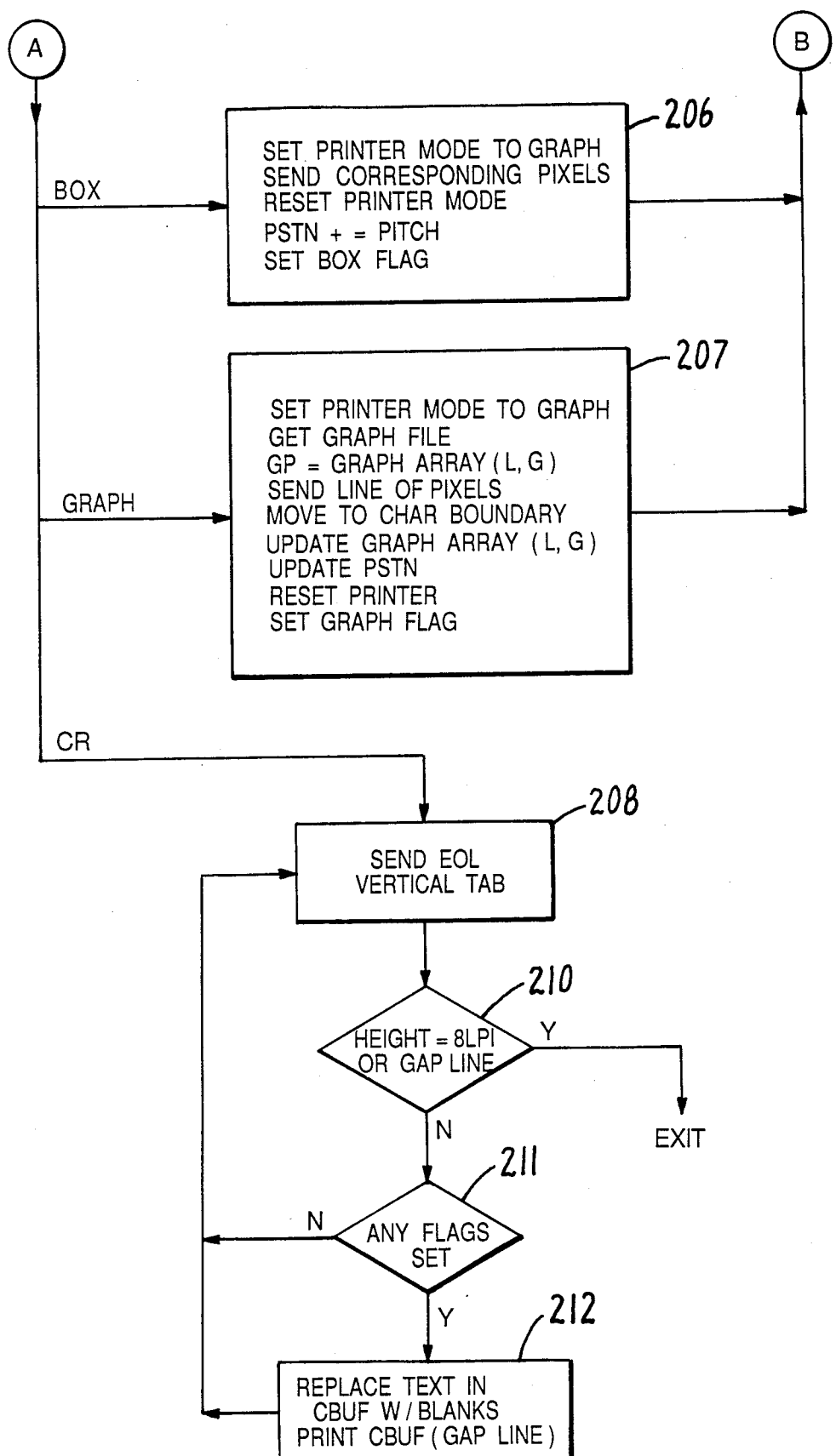

Referring to FIG. 12, the process for printing the contents of the Character Buffer 52 is as follows. First (box 190) the process is initialized by clearing the print flags, setting the height of the print line in accordance with whether the label's format is 6 or 8 lpi, setting a column counter for indexing into CBuf to zero, setting a pixel position counter Pstn to zero, and setting a label counter L to 1.

The print flags include a BOLD flag for keeping track of whether the printer is printing bold or regular text (so that the printer can be automatically reset to regular text mode at the end of the current line); a GAP flag for indicating if this is the first or second printing pass when the printer in in 6 lpi mode; and a BAR code flag, a GRAPHICS flag, and a BOX graphics flag, for indicating that these features need to be printed on the second pass if these features were found on the first pass when printing in 6 lpi mode.

Next, each code in CBuf is processed in accordance with its value. If, for instance, the code is the code for a standard text character, the code is sent to the printer (box 192). Then the column counter is incremented (box 194) so that the next character in CBuf can be processed.

For each item printed and for each movement of the print head, the pixel position counter Pstn is updated to reflect the current position of the printer within the current label.

If the code is centering code, used for autocentering, the printer is sent instructions to move the specified number of pixels (box 196).

Moving the print head, however, is not a simple matter of telling the printer to "tab" to a specified position because the printer's tabbing is not as accurate as the movement caused by printing. Since graphic, bar and box images must be vertically aligned as accurately as possible, the system instructs the printer to print a specified number of blank pixels.

If the code is a horizontal tab, then the printer is moved to the beginning of the next label in the current row (box 200) by instructing the printer to print Lsize - Pstn blank pixels (in graphics mode), where Lsize is in the number of pixels between the beginning postions of two horizontally adjacent labels. Since a new label is being started, Pstn is reset to zero and the label counter L is incremented.

If the code is for toggling the Bold flag, the printer's Bold flag is toggled (box 198), thereby turning on or off the printing of text in bold format.

Pitch codes are processed by resetting the printer's pitch and font, and setting the Pitch variable to reflect the current pitch being used by the printer (box 202). The Pitch variable is used for incrementing the Pstn counter when text is printed.

Bar codes are handled as a block (box 204). First the printer is put into graphics mode, and the print head is moved a specified distance called a dead zone. Then the Start character (a predefined pattern or character) is printed. Next, bar codes are printed for all of the codes until encountered until the end of Bar code. Then a stop character is printed and the printer is moved over another dead zone. Finally, the printer is moved to the next character boundary (i.e., to a position which is an integer number of character pitches from the starting point of the Bar code), the printer mode is reset to text, and Pstn is updated.

Box codes are processed by sending the corresponding image to the printer in graphics mode, and incrementing Pstn by the pitch of one "10 CPI" character (box 206).

Graphic images are, like bar codes, handled as a block (box 207). The printer is but in graphics mode. Then, using the graphics table 54, the routine finds out how much of the specified image has already been printed. The next band of pixels is read from the graphics image file and sent to the printer. This requires extracting pixel data from a number of different rows of pixel data in the graphics image file because the printer prints 15 or 23 vertically adjacent pixels at a time (depending on whether the printer is printing 6 or 8 lpi) while data is stored in 8 pixel packages. In any case, after the data is sent the graphics table is updated to reflect the number of pixel rows which have now been printed. Finally, the printer is moved to the next character boundary (i.e., to a position which is an integer number of character pitches from the starting point of the graphics image), the printer mode is reset to text, and Pstn is updated.

When a carriage return is encountered, the end of CBuf has been reached. An end of line instruction is sent to the printer and the printer is vertically tabbed to the next row of blank labels (box 208). If the printer is in 8 lpi mode (box 210) then the routine exits.

If, however, the printer is in 6 lpi mode, then a second pass must be made (box 212) to cover the second 15 pixel band of the current line. If the print flags (box 211) indicate that there no bars, graphic images and boxes on the current line, the printer is just vertically tabbed 15 pixels. Otherwise, all the standard text and half height bars in Cbuf are replaced with blank spaces, box graphics are replaced with spaces or vertical line segments as appropriate, and Cbuf is printed a second time before the printer is vertically tabbed a second time.

While the present invention has been dsecribed with reference to a few specific embodiments, the description is illustrative of the invention and is not to be construed as limiting the invention. Various modifications may occur to those skilled in the art without departing from the true spirit and scope of the invention as defined by the appended claims.

TABLE 1
FORMAT FOR LABEL DESIGN FILES

| Byte | Description | |
|---|---|---|
| 00–01 | Length of entire file. | |
| 02 | Status Code | B0 obsolete/valid flag, 0=obsolete |
| | | B1 Autocentering 1=autocenter |
| | | B2 Serial number in file |
| | | B3–B7 undefined |
| 03 | Label Type | 00-7F Standard ROM based format |
| | | 80-FF Custom Disk based format |
| 04–07 | Serial Number, double precision number 99,999,999 | |
| 08–END | File Data | |
| | 20-5E, 60-7E | Standard ASCII characters |
| | 5C | S/N Place |
| | 0D | Line return with line feed, resets pitch to default value, must terminate each line. |
| | 10 | Global Date (up to 8 ASCII char's MM/DD/YY) |
| | 90 - 9F | Graphic Symbol 0 to 11 |
| | 80 - 8A | Box Graphic characters |
| | 04 | Start/Stop Bold print |
| | 09 | Start condensed 30 CPI pitch |
| | 12 | Start expanded 5 CPI pitch |
| | 13 | Start standard 10 CPI pitch |
| | 14 | Start condensed 20 CPI pitch |
| | 16 | Start C39 human readable Bar code |
| | 17 | End C39 Bar code line both code & readable |
| | 18 | Start C39 Bar code (last line of code) |
| | 19 | Start C39 Bar code - fill in interline gap |
| | 1A | Start I2/5 human readable Bar code |
| | 1B | End I2/5 code |
| | 1C | Start I2/5 last line - leave gap |
| | 1D | Start I2/5 - fill in interline gap |

TABLE 2
SAMPLE LABEL DESIGN FILE

| BYTE | DATA | DESCRIPTION |
|---|---|---|
| 00 | 8F | LSB OF FILE LENGTH |
| 01 | 00 | MSB OF FILE LENGTH |
| 02 | 01 | STATUS BYTE, ACTIVE, NO AUTO CENTER, NO S/N |
| 03 | 18 | FORMAT CODE |
| 04 | 00 | S/N - not used (see NO S/N STATUS) |
| 05 | 00 | S/N |
| 06 | 00 | S/N |
| 07 | 00 | S/N |
| 08 | 9A | GRAPHIC SYMBOL #10 |
| 09 | 9A | GRAPHIC SYMBOL #10 |
| 0A | 9A | GRAPHIC SYMBOL #10 |
| 0B | 9A | GRAPHIC SYMBOL #10 |
| 0C | 9A | GRAPHIC SYMBOL #10 |
| 0D | 20 | SPACE |
| 0E | 09 | 30 CPI TEXT TO FOLLOW |
| 0F | 53 | S |
| 00 | 55 | U |
| 11 | 50 | P |
| 12 | 45 | E |
| 13 | 52 | R |
| 14 | 20 | SPACE |
| 15 | 43 | C |
| 16 | 4F | O |
| 17 | 4E | N |
| 18 | 44 | D |
| 19 | 45 | E |
| 1A | 4E | N |
| 1B | 53 | S |
| 1C | 45 | E |
| 1D | 44 | D |
| 1E | 20 | SPACE |
| 1F | 50 | P |
| 20 | 52 | R |
| 21 | 49 | I |
| 22 | 4E | N |
| 23 | 54 | T |
| 24 | 20 | SPACE |
| 25 | 33 | 3 |
| 26 | 30 | 0 |
| 27 | 43 | C |
| 28 | 50 | P |
| 29 | 49 | I |
| 2A | 0D | END OF LINE 1 |
| 2B | 9A | GRAPHIC SYMBOL #10 |
| 2C | 9A | GRAPHIC SYMBOL #10 |
| 2D | 9A | GRAPHIC SYMBOL #10 |
| 2E | 9A | GRAPHIC SYMBOL #10 |
| 2F | 9A | GRAPHIC SYMBOL #10 |
| 30 | 20 | SPACE |
| 31 | 14 | 20 CPI TEXT TO FOLLOW |
| 32 | 43 | C |
| 33 | 4F | O |
| 34 | 4E | N |
| 35 | 44 | D |
| 36 | 45 | E |
| 37 | 4E | N |
| 38 | 53 | S |
| 39 | 45 | E |
| 3A | 44 | D |
| 3B | 20 | SPACE |
| 3C | 50 | P |
| 3D | 52 | R |
| 3E | 49 | I |
| 3F | 4E | N |
| 40 | 54 | T |
| 41 | 20 | SPACE |
| 42 | 32 | 2 |
| 43 | 30 | 0 |
| 44 | 43 | C |
| 45 | 50 | P |
| 46 | 49 | I |
| 47 | 0D | END OF LINE 2 |
| 48 | 04 | START OF BOLD PRINT |
| 49 | 42 | B |
| 4A | 4F | O |
| 4B | 4C | L |
| 4C | 44 | D |
| 4D | 04 | END OF BOLD PRINT |
| 4E | 20 | SPACE |
| 4F | 20 | SPACE |
| 50 | 53 | S |
| 51 | 54 | T |
| 52 | 41 | A |
| 53 | 4E | N |
| 54 | 44 | D |
| 55 | 41 | A |
| 56 | 52 | R |
| 57 | 44 | D |
| 58 | 20 | SPACE |
| 59 | 20 | SPACE |
| 5A | 20 | SPACE |
| 5B | 20 | SPACE |
| 5C | 20 | SPACE |
| 5D | 0D | END OF THIRD LINE |
| 5E | 12 | EXPANDED 5 CPI TEXT TO FOLLOW |
| 5F | 45 | E |
| 60 | 58 | X |
| 61 | 50 | P |

TABLE 2-continued
SAMPLE LABEL DESIGN FILE

| BYTE | DATA | DESCRIPTION |
|---|---|---|
| 62 | 41 | A |
| 63 | 4E | N |
| 64 | 44 | D |
| 65 | 45 | E |
| 66 | 44 | D |
| 67 | 0D | END OF 4TH LINE |
| 68 | 19 | START OF BAR CODE 39 DATA WITH FILLED IN GAP |
| 69 | 45 | E   - bar |
| 6A | 50 | P     code |
| 6B | 43 | C       sequence |
| 6C | 17 | END OF BAR CODE 39 DATA |
| 6D | 80 | BOX GRAPHICS - TOP LEFT CORNER |
| 6E | 81 | BOX GRAPHICS - HORIZONTAL LINE |
| 6F | 81 | BOX GRAPHICS - HORIZONTAL LINE |
| 70 | 81 | BOX GRAPHICS - HORIZONTAL LINE |
| 71 | 81 | BOX GRAPHICS - HORIZONTAL LINE |
| 72 | 81 | BOX GRAPHICS - HORIZONTAL LINE |
| 73 | 82 | BOX GRAPHICS - TOP RIGHT CORNER |
| 74 | 0D | END OF 5TH LINE |
| 75 | 18 | START OF BAR CODE 39 DATA WITHOUT FILLED IN GAP |
| 76 | 45 | E |
| 77 | 50 | P |
| 78 | 43 | C |
| 79 | 17 | END OF BAR CODE DATA |
| 7A | 85 | BOX GRAPHICS - VERTICAL LINE |
| 7B | 42 | B |
| 7C | 4F | O |
| 7D | 58 | X |
| 7E | 45 | E |
| 7F | 53 | S |
| 80 | 85 | BOX GRAPHIC - VERTICAL LINE |
| 81 | 0D | END OF 6TH LINE |
| 82 | 16 | START OF HUMAN READABLE CODE 39 DATA |
| 83 | 45 | E |
| 84 | 50 | P |
| 85 | 43 | C |
| 86 | 17 | END OF BAR CODE 39 DATA |
| 87 | 86 | BOX GRAPHICS - BOTTOM LEFT CORNER |
| 88 | 81 | BOX GRAPHICS - HORIZONTAL LINE |
| 89 | 81 | BOX GRAPHICS - HORIZONTAL LINE |
| 8A | 81 | BOX GRAPHICS - HORIZONTAL LINE |
| 8B | 81 | BOX GRAPHICS - HORIZONTAL LINE |
| 8C | 81 | BOX GRAPHICS - HORIZONTAL LINE |
| 8D | 87 | BOX GRAPHICS - BOTTOM RIGHT CORNER |
| 8E | 0D | END OF 7TH LINE AND FILE |

TABLE 3
CONTROL CODES FOR CHARACTER BUFFER

| HEX CODE | DESCRIPTION |
|---|---|
| 08 xx xx | Auto Centering - move xx xx pixels |
| 09 | Horizontal Tab - to next blank label |
| 0D | Carriage Return - vertial tab to next row of blank labels |
| 0A | Start 30 CPI pitch |

TABLE 4
EXAMPLE OF CHARACTER BUFFER PRIOR TO PRINTING LINE 1, PRINTING TWO LABELS ACROSS IN GROUP MODE

| BYTE | DATA | DESCRIPTION |
|---|---|---|
| 00 | 9A | GRAPHIC SYMBOL #10 - NO AUTO CENTERING |
| 01 | 9A | GRAPHIC SYMBOL #10 |
| 02 | 9A | GRAPHIC SYMBOL #10 |
| 03 | 9A | GRAPHIC SYMBOL #10 |
| 04 | 9A | GRAPHIC SYMBOL #10 |
| 05 | 20 | SPACE |
| 06 | 0A | 30 CPI TEXT TO FOLLOW (converted from "09") |
| 07 | 53 | S |
| 08 | 55 | U |
| 09 | 50 | P |
| 0A | 45 | E |
| 0B | 52 | R |
| 0C | 20 | SPACE |
| 0D | 43 | C |
| 0E | 4F | O |
| 0F | 4E | N |
| 00 | 44 | D |
| 11 | 45 | E |
| 12 | 4E | N |
| 13 | 53 | S |
| 14 | 45 | E |
| 15 | 44 | D |
| 16 | 20 | SPACE |
| 17 | 50 | P |
| 18 | 52 | R |
| 19 | 49 | I |
| 1A | 4E | N |
| 1B | 54 | T |
| 1C | 20 | SPACE |
| 1D | 33 | 3 |
| 1E | 30 | 0 |
| 1F | 43 | C |
| 20 | 50 | P |
| 21 | 49 | I |
| 22 | 09 | END OF LINE 1 ("09" - horizontal tab) |
| 23 | 9A | GRAPHIC SYMBOL #10 - NO AUTO CENTERING |
| 24 | 9A | GRAPHIC SYMBOL #10 |
| 25 | 9A | GRAPHIC SYMBOL #10 |
| 26 | 9A | GRAPHIC SYMBOL #10 |
| 27 | 9A | GRAPHIC SYMBOL #10 |
| 28 | 20 | SPACE |
| 29 | 0A | 30 CPI TEXT TO FOLLOW |
| 2A | 53 | S |
| 2B | 55 | U |
| 2C | 50 | P |
| 2D | 45 | E |
| 2E | 52 | R |
| 2F | 20 | SPACE |
| 30 | 43 | C |
| 31 | 4F | O |
| 32 | 4E | N |
| 33 | 44 | D |
| 34 | 45 | E |
| 35 | 4E | N |
| 36 | 53 | S |
| 37 | 45 | E |
| 38 | 44 | D |
| 39 | 20 | SPACE |
| 3A | 50 | P |
| 3B | 52 | R |
| 3C | 49 | I |
| 3D | 4E | N |
| 3E | 54 | T |
| 3F | 20 | SPACE |
| 40 | 33 | 3 |
| 41 | 30 | 0 |
| 42 | 43 | C |
| 43 | 50 | P |
| 44 | 49 | I |
| 45 | 09 | END OF LINE 1 |
| 46 | 0D | CARRIAGE RETURN |

What is claimed is:

1. A method of printing labels with a computer controlled impact printer, said printer having a resolution of at least 100 pixels per inch, said printer having a text mode and a graphics mode of operation, said printer responding in text mode to predefined text codes by printing text images and responding in graphics mode to packets of pixel data by printing said pixel data; said printer including memory means for storing data and input means for receiving input and instructions from the user of said printer; the steps of the method comprising:

- storing a multiplicity of graphic images in said memory means;
- storing a multiplicity of label designs in said memory means, the information in each said label design being formated in accordance with a predefined label data structure having means for specifying on a line by line basis one or more text strings and the position of said text strings in said label, and one or more of said graphic images and the position of said graphic images in said label, wherein said text and said graphic images can be positioned side by side;
- accepting input from said user specifying the identity of one or more of said label designs to be printed, the quantity of each said specified label design to be printed, and the order in which to print said label designs; and
- controlling the printing of said specified label designs by said printer on forms of blank labels having rows of blank labels with a known number of blank labels in each said row, by repetitively performing the steps of
  - positioning said printer at the beginning of a row of blank labels,
  - generating, in accordance with said specified order, a first list of the label designs to be printed on said row of blank labels, and
  - for each line of said selected label designs:
    - generating, from said list of label designs and said stored label designs, a second list of the text strings and graphic images to be printed on said line, said list including positioning information for said text strings and said graphic images,
    - for each graphic image included in said second list, selecting the portion of the graphic image to be printed on said line; and
    - commanding said printer to print the items in said second list in accordance with the positioning information in said second list, including sending commands to print said text strings in text mode and said graphic images in graphics mode.

2. The method of claim 1, wherein
said predefined label data structure includes means for specifying one or more bar code sequences to be printed in accordance with a predefined bar code format; and
said method includes performing the steps of:
  - including in said second list, the bar code sequences to be printed on the current line; and
  - commanding said printer to print the bar code sequences in said second list in said predefined bar code format, said commanding step including sending commands to print said bar code sequences in graphics mode.

3. The method of claim 2, wherein
said printer includes means for printing X vertically adjacent pixels per pass over a row of said labels;
each said line of said label designs is Y pixels high, where Y is larger than X; and
said method includes performing, for each line of said selected label designs, the steps of:
  - commanding said printer during each of a first predetermined number of passes to print all the items in said second list; and
  - commanding said printer during each of a second predetermined number of passes to print said graphic images and said bar code sequences, but not said text in said second list;
- whereby an interline gap is generated between vertically adjacent lines of text, but no interline gap is generated in the middle of said graphic images and said bar code sequences.

4. A method of printing labels with a computer controlled impact printer, said printer having a text mode and a graphics mode of operation, said printer responding in text mode to predefined text codes by printing text images and responding in graphics mode to packets of pixel data by printing said pixel data; said printer including memory means for storing data and input means for receiving input and instructions from the user of said printer; the steps of the method comprising:

- storing a multiplicity of label designs, each label design specifying one or more text strings and the position of said text strings in said label design, and one or more graphic images and the position of said graphic images in said label, wherein said text and said graphic images can be positioned side by side; and
- controlling the printing of a specified quantity of specified one of said stored label designs, in a specified order, on blank sheets of labels having labels organized in rows with a plurality of blank labels in each row, by repetitively performing the steps of
  - positioning said printer at the beginning of a row of blank labels;
  - selecting, in accordance with said specified order, the labels to printed on the current row of blank labels; and
  - for each line of said selected labels, sending said printer instructions for
    - positioning said printer at the beginning of the line to be printed;
    - for each graphic image on the current line to be printed, selecting the portion of the graphic image to be printed on the current line; and
    - commanding said printer to print the text in the current line in text mode, and to print the graphic images in the current line in graphics mode.

5. Printing apparatus for printing label designs on blank labels, said blank labels being organized in rows of one or more labels per row, comprising:
- a dot matrix impact printer with a resolution of at least 100 pixels per inch, said printer having a text printing mode and a graphics printing mode of operation;
- computer means coupled to said printer for printing specified label designs, said computer means including input means for receiving input and instructions from the user of said printer, memory means for storing data, and software means for performing the steps of:
  - storing a multiplicity of graphic images in said memory means;
  - storing a multiplicity of label designs in said memory means, the information in each said label design being formated in accordance with a predefined label data structure having means for specifying on a line by line basis one or more text strings and the position of said text strings in said label, and one or more of said graphic images and the position of said graphic images in said label, wherein said text and said graphic images can be positioned side by side;

accepting input from said user specifying the identity of one or more of said label designs to be printed, the quantity of each said specified label design to be printed, and the order in which to print said label designs; and controlling the printing of said specified label designs by said printer on forms of blank labels having rows of blank labels with a known number of blank labels in each said row, by repetitively performing the steps of positioning said printer at the beginning of a row of blank labels, generating, in accordance with said specified order, a first list of the label designs to be printed on said row of blank labels, and for each line of said selected label designs:

generating, from said list of label designs and said stored label designs, a second list of the text strings and graphic images to be printed on said line, said list including positioning information for said text strings and said graphic images, for each graphic image including in said second list, selecting the portion of the graphic image to be printed on said line; and commanding said printer to print the items in said second list in accordance with the positioning information in said second list, including sending commands to print said text strings in text mode and said graphic images in graphics mode.

6. The apparatus of claim 5, wherein said printer includes font means for defining text images to be printed in response to corresponding to alphanumeric codes when said printer is in text mode, said font means including means for defining a multiplicity of box drawing component text images corresponding to preselected box codes; and said software includes means for storing said box codes in said label designs to represent lines and boxes in said label designs, and means for commanding said printer to print the corresponding box drawing component text images in text mode.

7. The apparatus of claim 5, wherein said printer includes means for printing X vertically adjacent pixels per pass over a row of said labels;

each said line of said label designs is Y pixels high, where Y is larger than X;

said software means includes means for performing, for each line of said selected label designs, the steps of:

commanding said printer during each of a first predetermined number of passes to print both said text and said graphic images in said second list; and commanding said printer during each of second predetermined number of passes to print said graphic images, but not said text in said second list;

whereby an interline gap is generated between vertically adjacent lines of text, but no interline gap is generated in the middle of said graphic images.

8. The apparatus of claim 5, wherein said predefined label data structure includes means for specifying one or more bar code sequences to be printed in accordance with a predefined bar code format; and said software means includes means for performing the steps of:

including in said second list, the bar code sequences to be printed; and commanding said printer to print the bar code sequences in said second list in said predefined bar code format, said commanding step including sending commands to print said bar code sequences in graphics mode.

9. The apparatus of claim 8, wherein said printer includes means for printing X vertically adjacent pixels per pass over a row of said labels;

each said line of said label designs is Y pixels high, where Y is larger than X;

said software means includes means for performing, for each line of said selected label designs, the steps of:

commanding said printer during each of a first predetermined number of passes to print all the items in said second list; and commanding said printer during each of a second predetermined number of passes to print said graphic images and said bar code sequences, but not said text in said second list;

whereby an interline gap is generated between vertically adjacent lines of text, but no interline gap is generated in the middle of said graphic images and said bar code sequences.

10. The apparatus of claim 5, wherein said predefined label data structure includes means for specifying that the corresponding label design includes a serial number which increments each time said label design is printed, and means for specifying the position of said serial number in said label design;

each said stored label design includes means for storing the current value of the serial number associated with said label design; and said software means includes means for performing the steps of:

for each label design in said first list which includes a serial number, including in said second list for the line of said label design where said serial number is positioned text corresponding to the current serial number value associated with said label design, and incrementing said serial number value associated with said label design.

* * * * *